Nov. 9, 1943.  I. C. SCHOONOVER ET AL  2,333,679
PROCESS FOR PROTECTING PLASTICS DURING CURING OR MOLDING
Filed June 30, 1942

IRL C. SCHOONOVER
GEORGE R. DICKSON
INVENTORS

BY
ATTORNEY

Patented Nov. 9, 1943

2,333,679

UNITED STATES PATENT OFFICE 2,333,679

PROCESS FOR PROTECTING PLASTICS DURING CURING OR MOLDING

Irl C. Schoonover and George R. Dickson, Washington, D. C., assignors to the Government of the United States, as represented by the Secretary of Commerce Application June 30, 1942, Serial No. 449,140

8 Claims. (Cl. 18—47)

(Granted under the act of March 3, 1883, as amended April 30, 1928; 370 O. G. 757)

This invention or discovery relates to a new and more efficient method for the protection of plastics or similar materials while in the process of being fabricated, repaired or adjusted.

The necessity of some protective medium between surfaces such as resin and plaster during molding operations, e. g., the curing of a denture, is well recognized. In the absence of such protection the resin adheres to the plaster, is often discolored and requires excessive polishing, especially in areas where an exact reproduction, as of the oral tissue, is necessary. The discoloration or "blush" of resins insufficiently protected is thought to be the result of absorption of water or other materials from the plaster during the curing or molding operation.

Tinfoil laid on the surface of the mold has been almost universally used as a protective medium; however, the proper application of tinfoil to the mold is a tedious process and one which requires much skill if satisfactory results are to be obtained. Because of this and of the present shortage of tin, it is highly desirable that a way be found to provide a protective medium suitable for this purpose by using material which is easier to apply and which is also available in adequate quantities.

This invention is particularly useful in providing a protective medium, which may be used in place of the metal foils (such as tinfoil) used in the processing of dental plates, and which has many qualities of superiority over the foils which hitherto have been so universally used.

Figure 1:
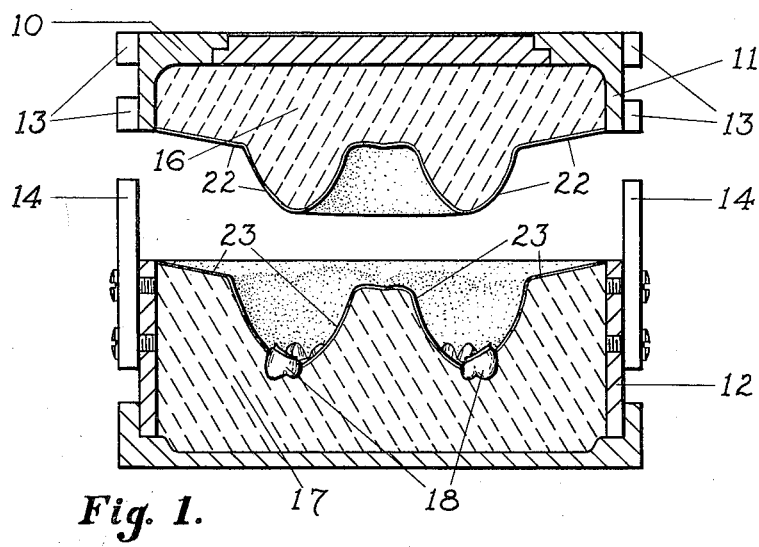
Figure 2:
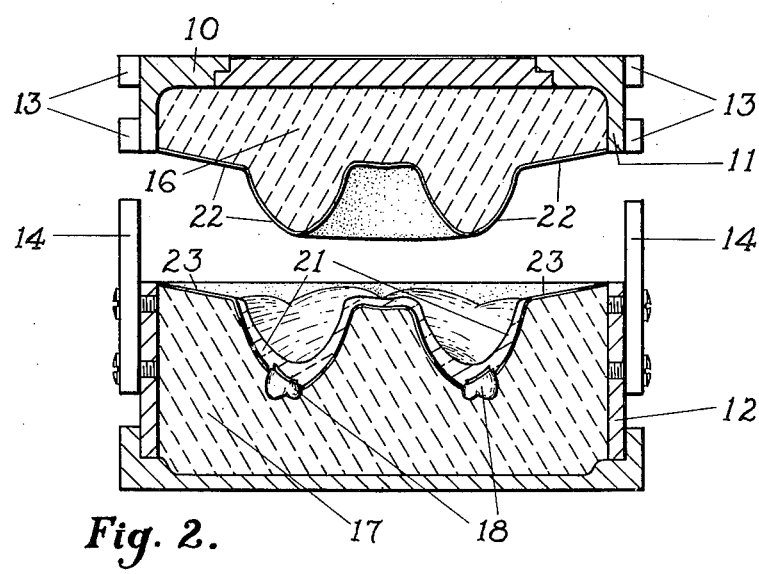

In the accompanying drawing:

Fig. 1 is a transverse section through a flask with the sections thereof separated and showing the cooperating portions of the formed mold lined with a protective film with the teeth in place; and Fig. 2 is a view similar to Fig. 1, but also showing in the lower section of the mold a denture which has been formed in this flask.

In the drawing there is shown a dental flask 10, comprising upper and lower separable sections 11 and 12, respectively, which may be equipped with engageable fittings 13 and 14 for holding sections 11 and 12 in proper alignment when these sections are brought together during the formation of a denture. The mold comprises cooperating halves 16 and 17 carried respectively by the upper and lower sections of the flask. Artificial teeth 18 are shown in position in the lower half of the mold.

In the technic for dental prosthesis, impressions of the oral cavity are used to create models of the oral tissues in some cement or plaster-like material, such as those prepared from calcium sulfate. The upper half 16 of the mold shown in the drawing may be formed in this manner so as to have a configuration which is complementary to the impression and which therefore, corresponds to the form of the oral tissue. Full dentures, partial dentures, etc., are constructed in wax adapted to these set models. Thus, a denture such as the one shown at 21 in Fig. 2 may be formed in wax on the upper half 16 of the mold. Teeth or attachments, as for example teeth 18, may be set in the wax as desired and the entire assembly comprising the upper half 16 of the mold with the wax denture including the teeth set therein may be covered with the same cement or plaster-like material which was used to form the upper half of the mold. It will be seen that the lower half 17 of the mold may be formed in this manner. After the cement has set, this lower half of the mold may be removed. The wax may be softened and removed, thereby leaving a corresponding recess or cavity, between the juxtaposed halves of the mold, into which plastic may be packed in preparation for the curing process in the formation of a denture.

Prior to packing plastics such as rubber, resins or mixtures into the cavity it is necessary that the cavity be lined to prevent moisture or salts from the set cement or plaster and moisture or other items from the curing chamber from coming in contact with the dental appliance during the curing or molding technic which usually is a thermal process. When foil is used for lining the cavity, this becomes an exacting, tedious job as every corner and surface must be covered. Tinfoil has been used almost universally for this purpose. The foiling of a denture is an art and must be learned by extended efforts.

Our new discovery makes it possible to omit the foil and to substitute therefor a material or materials which can be sprayed or painted on, flowed on or deposited on the surface by dipping. The amount to be used is very small as it is only necessary to establish a film between the model and the denture. This film also has the advantage that it will strip readily from the cured plastic. We have discovered that a film of an insoluble salt of alginic acid has these properties and may be used for this purpose.

In accordance with this invention these films may be formed from any water soluble alginate or from insoluble alginates of metallic ions which will dissolve in ammonia. For example, water soluble alginates such as potassium, sodium, magnesium or ammonium alginate when dissolved in water containing small amounts of a suitable plasticizer, preferably glycerine, will give a solution which may be sprayed on, painted on, or flowed on or deposited on the mold surfaces by dipping to produce a film which later may be made insoluble by immersion in a second solution which converts the soluble alginate to an insoluble form. The film thus formed on the opposing, cooperating faces of the halves of the mold is indicated at 22 and 23.

The film-forming solution for water soluble alginates may be prepared by dissolving any one of the water soluble salts of alginic acid in a solution containing water and a plasticizer, such as glycerine. Preferably, we use an alginate which can be dissolved in water to form a five or six percent solution, by weight, which will flow readily, as this reduces the number of applications required to form a protective film of adequate thickness. For our solution we have dissolved 5 grams of ammonium alginate in a solution containing 80 cc. of water and 20 cc. of glycerine. These proportions are not critical and may be varied. For example, solutions containing more or less alginate will work equally well. The amount of glycerine added may also vary; however, little advantage is obtained by adding more than 20 cc. of glycerine to each 80 cc. of alginate solution in water. Preferably, 15 to 20 percent glycerine by volume is used to form our first solution. However, usable films may be obtained with lower percentages of glycerine, but these films may be more difficult to handle, as will be understood by those skilled in this art. Preferably, this film-forming solution is prepared by adding water to the alginate and stirring vigorously, as with a motor driven stirrer, or by permitting the water and the alginate to stand in contact with each other for one or more days with occasional agitation. If desired, a small quantity of some suitable preservative may be added to avoid any tendency of the solution to mold. Preferably, the glycerine and the preservative are added after the alginate is in solution. It is desirable that all small lumps and grains of the alginate be completely disintegrated, as otherwise rough films will result.

The second solution or the one for hardening this film, may be prepared from a number of water soluble salts. In fact, any water solution containing ions of calcium, barium, bismuth, lead, iron, nickel, silver, copper or any metallic ion which will convert the water soluble alginate into a corresponding insoluble alginate may be used. The exact concentration of any these solutions is not critical and may be varied within wide limits. It is only necessary that sufficient of the metallic ions be present to convert the soluble alginate into the insoluble form. A saturated solution of calcium chloride in water works well and is easily prepared; however, a five or ten percent solution will work equally well. In fact, a hardening solution may be prepared from a mineral acid alone, but such solutions may attack the metal parts of the mold.

A convenient mode of carrying out the process of forming films 22 and 23 on the mold surfaces by the use of water soluble alginates comprises forming a deposit of the film-forming solution on the mold as by dipping molds 16 and 17 into the alginate solution. The two halves of the flask, with the wax removed, and with teeth 18 and any appliances in place in the mold may be dipped into the alginate solution and then removed from this solution and the excess alginate permitted to drain off. One or more dippings may be necessary, depending upon the amount of alginate dissolved in the solution. Not more than two dippings were required for the alginate solution previously described herein. The film is permitted to air dry until the surface is not tacky when touched. Approximately five to fifteen minutes will be sufficient for this drying and this time may be shortened if the two halves of the flask are placed in a current of air, as in the air stream of an electric fan. At this stage the film is readily torn and should be handled with care. Both halves of the flask containing the molds may then be immersed in the hardening solution for approximately five to fifteen minutes, although a longer time will do no harm. The film will become tough and glossy in this solution. The halves of the flask are then removed from the hardening solution and the excess liquid is permitted to drain off. The molds are then ready for use. The film shrinks appreciably on drying; therefore it is advisable to keep the film moist. In this procedure spraying, painting or flowing the alginate solution on the mold surfaces may be practiced instead of dipping the mold surfaces into the solution, should this be desired.

It may be desirable for some purposes to grease the surface of the hardened film with a small amount of some grease-like material such as petrolatum, particularly if the molds must be preheated, as in the processing of resins which soften or cure at high temperatures.

In the above procedure the exposed portion of the teeth will come in contact with the alginate solution. This is of no consequence as the alginate will not adhere to the tooth surface. Teeth with holes in them will of course be partially filled with the alginate solution. This is readily removed after the hardening treatment with the aid of any suitable needle-like pick instrument.

In some cases it may be necessary to remove excess alginate film from around the teeth; this is readily done by cutting the material away with a sharp pointed instrument.

The film will appear to be much too thick at the time of packing but after trial packing and curing it will be found that the thickness is not more than the usual tinfoil and in most cases it will be much less.

One of the advantages of the material is the ease with which the flask may be opened after curing the denture. Only a slight force is necessary to separate the two halves of the flask and the alginate film will peal off the denture leaving a smooth surface which at most will require but little polishing.

A film, similar to that prepared with the water soluble alginate may be prepared in accordance with this invention by using insoluble alginates which dissolve in ammonical solutions through the formation of complex ions with the ammonia. A film forming solution may be prepared for this procedure by dissolving in concentrated ammonia an insoluble alginate, such as silver alginate, copper alginate, iron alginate, cobalt alginate, or any one of the insoluble alginates which form complex ions with ammonia. The quantity of alginate to be dissolved in the preparation of this solution is not critical and will vary with the insoluble alginate used and the procedure to be followed in applying the film, that is, whether it is to be sprayed, painted, dipped or flowed on the model surface.

The film when applied by any of the above procedures when dry leaves a deposit of the insoluble alginate which may be used without further hardening.

The invention or discovery described herein may be manufactured, practiced and used by or for the Government for governmental purposes without the payment to us of any royalty thereon.

It should be understood that the present disclosure is for the purposes of illustration only, and that this invention or discovery includes all modifications and equivalents which fall within the scope of the appended claims.

We claim as our invention and desire to secure by our patent:

1. The method of protecting plastics during curing or molding, which comprises providing a protective medium between the molding surface and the plastic to be molded by applying to the molding surface a film comprising an insoluble salt of alginic acid.

2. The method of protecting plastics during curing or molding, which comprises providing a protective medium between the molding surface and the plastic to be molded by applying to the molding surface a film comprising a water soluble alginate.

3. The method of protecting plastics during curing or molding, which comprises providing a protective medium between the molding surface and the plastic to be molded by applying to the molding surface a film comprising a water soluble alginate and a plasticizer, and converting soluble alginate in this film to an insoluble form.

4. The method of protecting plastics during curing or molding, which comprises providing a protective medium between the molding surface and the plastic to be molded by applying to the molding surface a film comprising a water soluble alginate and glycerine, and converting soluble alginate in this film to an insoluble form.

5. The method of protecting plastics during curing or molding, which comprises providing a protective medium between the molding surface and the plastic to be molded by applying to the molding surface a film comprising a water soluble alginate and a plasticizer, and applying to this film a water solution containing metallic ions which will convert soluble alginate in this film to an insoluble form.

6. The method of protecting plastics during curing or molding, which comprises providing a protective medium between the molding surface and the plastic to be molded by applying to the molding surface a film comprising an insoluble alginate which dissolves in ammonical solutions through the formation of complex ions with the ammonia.

7. In the art of plastic fabrication, the steps of preparing a mold which comprises applying to the molding surface of the mold a film-forming solution of a water soluble alginate, thereafter drying the mold until the surface of the film formed therein is not tacky to the touch, and then converting the film on said mold to a water insoluble alginate by treatment with a solution containing ions selected from the group consisting of calcium, barium, bismuth, lead, iron, nickel, silver and copper.

8. A mold for fabricating plastics of the class used for artificial dentures, said mold being lined with a thin film of water insoluble alginate formed in situ on the mold surface of said mold.

IRL C. SCHOONOVER.
GEORGE R. DICKSON.